UNITED STATES PATENT OFFICE.

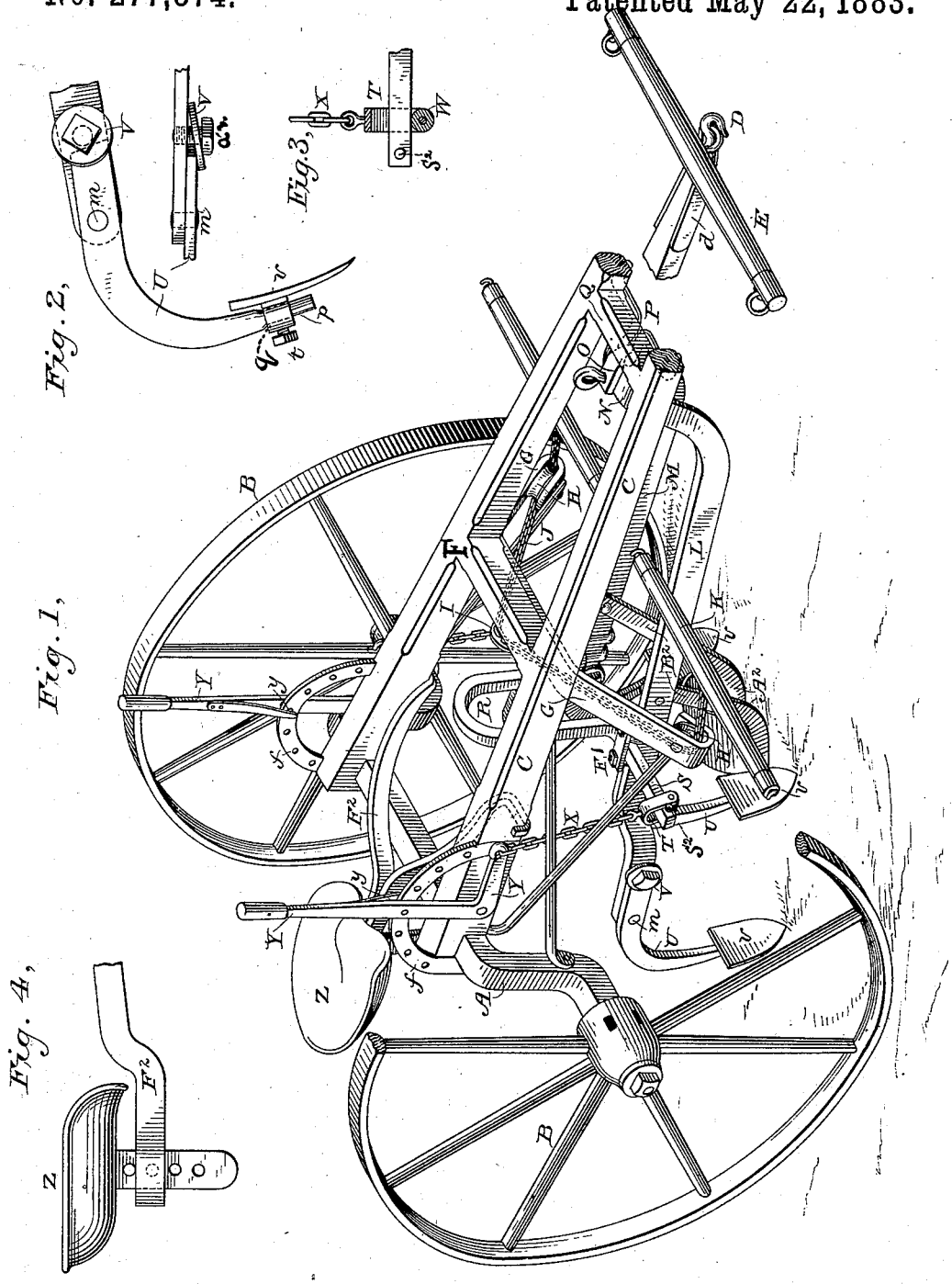

THOMAS W. BRENNAN AND DANIEL J. BRENNAN, OF WEXFORD, IOWA.

WHEEL-CULTIVATOR.

SPECIFICATION forming part of Letters Patent No. 277,874, dated May 22, 1883.

Application filed May 20, 1881. (No model.)

*To all whom it may concern:*

Be it known that we, THOMAS W. BRENNAN and DANIEL J. BRENNAN, citizen of the United States, residing at Wexford, (Lansing P. O.,) in the county of Allamakee and State of Iowa, have invented certain new and useful Improvements in Wheel-Cultivators; and we do declare the following to be a full, clear, and exact description of the invention, such as will enable others skilled in the art to which it appertains to make and use the same, reference being had to the accompanying drawings, and to the letters or figures of reference marked thereon, which form a part of this specification.

The present invention relates to that class of "straddle-row cultivators" in which an arched axle and elevated draft-tongue constitute the frame for supporting a pair of parallel plow or shovel carrying beams, the latter being combined with devices for throwing the shovels toward or from a row of growing plants, so as to adapt themselves to any irregularities thereof.

The object of the invention is to provide a cultivator of a simplified construction, in which the various parts are so combined and relatively arranged that the draft is rendered easy and light, while the plow-standards are held by novel means so as to yield to obstructions.

To these ends the invention consists in the construction and combination of parts hereinafter described, and then fully set forth in the claims.

In the accompanying drawings, Figure 1 is a perspective view of a cultivator constructed according to our invention. Fig. 2 is a detail view, showing the manner of connecting the shovel-standards to their beams. Fig. 3 is a detail view, showing the yoke and roller for receiving the connecting-bar of the shovel-beams. Fig. 4 is a detail representing the manner of adjusting the seat.

The letter A designates an arched axle, constructed of metal or wood, and having end spindles or arms for the reception of ground or transporting wheels B.

The tongue or draft-frame is composed of two long bars, C, which converge or come together at their front ends, and are connected thereat by means of a hook, D, having two plates, $d$. These plates embrace the ends of the bars C or apex of the draft-tongue, and are secured thereto by transverse bolts, rivets, or other devices. The hook D is adapted for the reception or attachment of an ordinary neck-yoke, E. The rear or divergent ends of the double draft-tongue are secured to the arched axle in any approved manner, and a transverse tongue-connecting bar, F, located in advance of said axle, serves as a point of attachment for a metallic bar or hanger, G. The central portion of said bar or hanger is made straight, and is bolted or otherwise secured to the bar F, and the end portions thereof extend obliquely in a downward direction, and have a return-bend at the bottom, so as to form bearings or supports for rotating sheaves or guide-rollers H. These sheaves, together with a third one, I, arranged at the rear side of the bar F, serve to receive and guide a chain, rope, or strap, J, which is connected at its ends with ordinary whiffletrees, K.

It will be manifest that by hitching the draft animals to the neck-yoke and whiffletrees, arranged as in the present instance, the draft is lowered considerably, thus decreasing the strain or weight upon the horse's neck, and creating a tendency to ease the propelling-power and obviate a too deep penetration of the shovels into the ground.

The plow or shovel beams (designated by the letters L M) are generally constructed of bar metal, and have a transverse connecting portion or plate, N, at the front. These parts are preferably made in one piece, and the plate N is jointed to a suitable clevis, O, which is itself jointed to an eye-plate, P, secured to a transverse bar, Q. This bar is attached to the draft-tongue at a narrower point thereof than the bar F. The beams L M are connected with a transverse bar, R, having an arched or curved central portion, and two horizontal end arms, S. These end arms are embraced by clips F', which extend around the plow-beams, and have retaining-nuts and clamping-plates at their upper ends. By loosening these nuts the plow-beams can be adjusted on the horizontal arms S, so as to throw the same farther apart or bring them closer together, in order to suit the varying widths of rows of growing plants to be tended or cultivated. This lateral adjustment of the beams is permitted by the elasticity or "springiness" of the metal used in their construction. The arms S also receive yoke or stirrups T, made of a U or other convenient shape, and each provided with a roller, W. The arms S are supported upon the rollers, as is clearly shown in Fig. 3, and removable stop-pin, $S^2$, on the outer end of each arm will tend to prevent the disengagement of the parts and permit the roller-stirrups to be applied to the arms. A chain-jointed rod or other flexible device, X, is connected with each roller-stirrup, and an elbow-lever, Y, connected with said chain or flexible connecting device, is arranged at each side of the draft tongue or frame in the manner fully indicated in Fig. 1. The levers Y, pivoted to or fulcrumed on the tongue, serve in connection with the chains X as a medium for raising and lowering the plow-beams from the driver's seat Z. Perforated or notched segments $f$, secured to the tongue or draft-frame in proper relation to the levers Y, serve to lock or retain the latter, and consequently permit the plows to work at varying depths, or to be raised and retained above ground when not in use. Suitable spring-dogs or catches, $y$, on the levers Y engage with the segments $f$ for locking these parts together.

It will be obvious that the arms S of the beam-connecting bar can move or slide through the roller stirrups or yokes without any liability of detaching these parts from each other, and hence it follows that the beams, or, rather, the plows carried by the same, can be made to follow the irregularities of a row of growing plants, or else the plows can be adjusted when the draft animals swerve from a straight path.

The plow standards or stocks U are connected with the beams in such a manner that they will maintain their proper working positions during the absence of obstructions in the ground. When a stone or other object is encountered the standards swing back so as to avoid injury to the shovels and other parts. The standards, four of which are generally employed, are pivoted to the beams at the point $m$, which is a short distance from their front ends. The free ends of the standards are received between the side of the beam and an obliquely-extending disk or circular plate, V, fitted on a bolt, $a^3$, extending through said beam.

It will be perceived that a V-shaped or angular space is left between the beam and the plate, so that by tightening the latter sufficient friction is produced for properly clamping the standards during the ordinary performances of work. The free ends of stocks U are beveled, and, coming in contact with the bolt $a^3$, are held in and prevented from passing the proper position to be secured by disk V. When, however, the pressure against the shovel or plow carried by the pivoted standard is too great, the latter will swing backward for the object heretofore stated. The lower ends, $p$, of the standards are made cylindrical, and corresponding clip plates or sockets, $q$, secured to the shovels $r$, carried by said standards, serve as means for giving an angular adjustment to the shovels or plows for causing the same to throw more or less earth toward the plants. Set-screws $t$, passed through the sockets $q$, serve to secure the shovels in position. A curved or arched fender or hood, $A^2$, arranged between the plow-beams, serves to prevent the young and tender plants from being covered by earth by passing over or inclosing said plants, as will be readily apparent. The hood or fender is connected with or secured to arms $B^2$, which are jointed to the shovel-beams, so as to permit said fender to rise and fall to adapt itself to the undulations of the ground. The driver's seat previously referred to is generally supported or mounted on a forked or branched bar or iron, $F^2$, which has an eye or socket at its rear end for receiving a block or arm on the seat, as is shown in Fig. 4. A set-screw or a wedge is employed for adjustably holding the seat in said socket. The front end of the seat bar or iron is turned in an outward and upward direction, and, fitting closely to the sides of frame-pieces C, is held in position by the weight of the parts. We do not wish to claim, broadly, a draft appliance consisting of a chain passing over pulleys on a downwardly-bent arm on the cultivator-frame and carrying end whiffletrees. We are also aware that pivoted shovel-standards have heretofore been held in a working position by friction-clamps, which release said standards when obstructions are encountered by the shovels.

What we do claim as new, and desire to secure by Letters Patent, is—

1. In a wheel-cultivator, the draft-bar G, having its ends doubled or formed with return-bends, and the sheaves H, having their bearings in said doubled ends, in combination with the wheeled frame, sheave I, chain J, and whiffletrees K, substantially as described.

2. In combination with the shovel-beam, the curved pivoted standard U, having beveled front end, the bolt $a^3$, and oblique friction-disk V, all constructed and adapted to operate as set forth.

In testimony whereof we affix our signatures in presence of two witnesses.

THOMAS W. BRENNAN.
DANIEL J. BRENNAN.

Witnesses:
WM. E. WIEHE,
MORITZ KERNDT, Jr.